United States Patent [19]

Gardner

[11] Patent Number: 5,392,846
[45] Date of Patent: Feb. 28, 1995

[54] HEAT/COOLING SYSTEM AND APPARATUS

[76] Inventor: Ernest A. Gardner, 142½ Canal Ave. NW., Canal Fulton, Ohio 44614

[21] Appl. No.: 176,514

[22] Filed: Jan. 3, 1994

Related U.S. Application Data

[63] Continuation of Ser. No. 973,735, Nov. 9, 1992, abandoned.

[51] Int. Cl.⁶ .............................................. F25B 29/00
[52] U.S. Cl. ...................................... 165/40; 165/48.1;
    165/53; 165/55; 165/59; 165/60; 165/65;
    165/122; 165/3; 415/206; 454/233; 416/178
[58] Field of Search ............... 415/206, 53.1; 416/178;
    165/3, 57, 48.1, 53, 55, 50, 59, 60, 65, 122;
    454/233; 237/69, 70

[56] References Cited

U.S. PATENT DOCUMENTS

| | | | |
|---|---|---|---|
| 2,207,714 | 7/1940 | Bulkeley | 165/3 |
| 2,419,119 | 4/1947 | Christensen | 165/3 |
| 2,568,278 | 9/1951 | Favot | 454/233 |
| 2,598,842 | 6/1952 | Scott | 237/69 |
| 3,074,477 | 1/1963 | Whalen | 165/50 |
| 3,335,654 | 8/1967 | Killam | 415/206 |
| 3,351,128 | 11/1967 | Barnd | 165/50 |
| 3,540,526 | 11/1970 | Hoaglund | 165/57 |
| 3,829,250 | 8/1974 | Samson, Jr. | 415/206 |
| 3,861,824 | 1/1975 | Sjoquist et al. | 416/178 |
| 4,018,266 | 4/1977 | Kay | 165/48.1 |
| 5,165,846 | 11/1992 | Possell | 415/206 |

FOREIGN PATENT DOCUMENTS

| | | | |
|---|---|---|---|
| 1471619 | 3/1967 | France | 165/41 |
| 0194239 | 10/1985 | Japan | 165/53 |

OTHER PUBLICATIONS

ASHRAE 1984 Systems, Chapter 10, pp. 10.1–10.5 from ASHRAE Handbook 1984 Systems (copyright 1984).

Primary Examiner—John K. Ford
Attorney, Agent, or Firm—Paul E. Milliken; Lee A. Germain

[57] ABSTRACT

This invention provides a heating/cooling system including a heating/cooling apparatus, the apparatus comprising a blower unit connected to a heat exchanger unit and both units are enclosed within a duct structure which is continuous from an upstream input end to a downstream output end. The blower unit comprises an electric motor direct-coupled to an impeller and the heat exchanger unit comprises a heat transfer assembly and both blower and heat exchanger units are of a size and configuration as to facilitate their mounting within the space defined by, for example, a pair of building floor joists. The space between the floor joists may be enclosed to function as a return air duct to the apparatus. The heating/cooling apparatus may be adapted for humidifying and dehumidifying air being pumped through the apparatus by the blower unit.

25 Claims, 4 Drawing Sheets

HEAT/COOLING SYSTEM AND APPARATUS

This is a continuation of application Ser. No. 07/973,735, filed Nov. 9, 1992, abandoned.

FIELD OF THE INVENTION

This invention generally pertains to heating and cooling of building spaces and, more particularly, to a system and apparatus for forced-air heating and cooling without resort to the installation of complex and extensive ducts to reach the spaces to be heated and cooled.

More specifically, the present invention provides a unique configuration for heating and cooling apparatus wherein a motor-impeller unit is coupled to a heat exchanger unit and these are configured for mounting within the volume space that normally exists between adjacent floor joists of a building construction. The space between adjacent floor joists is enclosed to form both supply and return ducts of the heating and cooling system.

BACKGROUND OF THE INVENTION

In the art of heating and cooling of building spaces, the units which provide the conditioned air for such spaces are conventionally of a size and capacity as to require that they be installed at locations which are relatively remote from the spaces to be heated and/or cooled. For example, heating and cooling units for single and/or multiple family dwellings are conventionally located in the basement of these type of buildings and they are specified so as to supply conditioned forced air to multiple spaces via ducts which are installed in conjunction with the heating/cooling units. While these units may be of a similar configuration for various type building constructions, the required supply and return ducts are configured according to the architectural design of the particular building. For most heating/cooling installations, the ducts must be customized to a particular building design and this tends to increase the cost of the total heating and cooling system. In many cases the cost of the ducts and their installation may exceed the cost of the heating/cooling unit. This, of course, relates directly to the length and complexity of the duct runs necessary to reach the spaces to be heated and cooled. In this respect also, multi-story commercial buildings are usually designed to have a distance between the floors of about twelve feet allowing for an eight-to-ten foot ceiling height and the remaining two-to-four feet are allocated to the installation requirements of the heating and cooling ducts and other elements of the building construction.

While many advances have been made in the heating and cooling industry as it pertains to heating/cooling unit efficiency and capacity, not much has been accomplished in the elimination of ducts which are necessary to move conditioned air to and from building spaces which are remotely located with respect to a centrally located heating/cooling unit. In this respect also, the specifications made for heating/cooling units which are applied to a particular building construction are usually greater than necessary to heat and/or cool the volume spaces of the building. This is, of course, largely due to the length and complexity of the duct runs. Thus, it is the present practice to use large capacity heating/cooling units to supply conditioned air to multiple building spaces via ducts and this arrangement has not changed irrespective of the other advances in the industry.

It is, therefore, in accordance with one aspect of the present invention an object to provide a heating/cooling system which eliminates much of the ductwork that is required in presently configured heating and cooling systems.

According to another aspect of the invention it is an object to provide a heating/cooling system wherein the unit apparatus may be located in close proximity to the building spaces to be heated and/or cooled.

According to still another aspect of the invention it is an object to provide a heating/cooling apparatus which exhibits an efficiency, capacity, and cost such that multiples of the apparatus may be installed to meet multiple building space requirements, and this, irrespective of the the building design and/or configuration.

In accordance with another aspect of the invention it is an object to provide a heating/cooling apparatus comprised of in-line positioned blower and heat exchanger units which are configured for mounting within the volume space which normally exists between adjacent floor joists of a building structure such that the volume space between adjacent joists may be enclosed to function as the supply and return ducts of the heating/cooling apparatus.

According to still another aspect of the present invention it is an object to provide a heating/cooling apparatus which may be specified to meet varying heating and cooling requirements of various type building spaces.

Finally and in accordance with another aspect of the present invention it is an object to provide a heating and cooling apparatus which facilitates ease of servicing and replacement and the cost of which is dramatically lower than the large sized and high capacity units which are presently being offered by the heating and cooling industry.

SUMMARY OF THE INVENTION

The various objects and advantages of the present invention are accomplished in a heating/cooling system including an apparatus comprising a blower unit having an electric motor direct-coupled to an impeller which generates forced airflow through a duct structure defining an upstream input end and a downstream output end, and, a heat exchanger unit having a heat transfer assembly for passing a heat transfer fluid through it to heat and cool airflow through the assembly, the heat exchanger unit having a duct structure which defines an upstream input end which is coupled to the downstream output end of the blower unit duct and a downstream output end which is adapted for directing the heated or cooled airflow to a building space where it is desired.

BRIEF DESCRIPTION OF THE DRAWINGS

The features and advantages of the present invention will be better understood and appreciated from a consideration of the following detailed description of the preferred embodiments when taken in conjunction with the accompanying drawings, in the several figures in which like-parts and/or elements bear like reference numerals or letters and wherein.

DETAILED DESCRIPTION OF THE INVENTION

Figure 1:
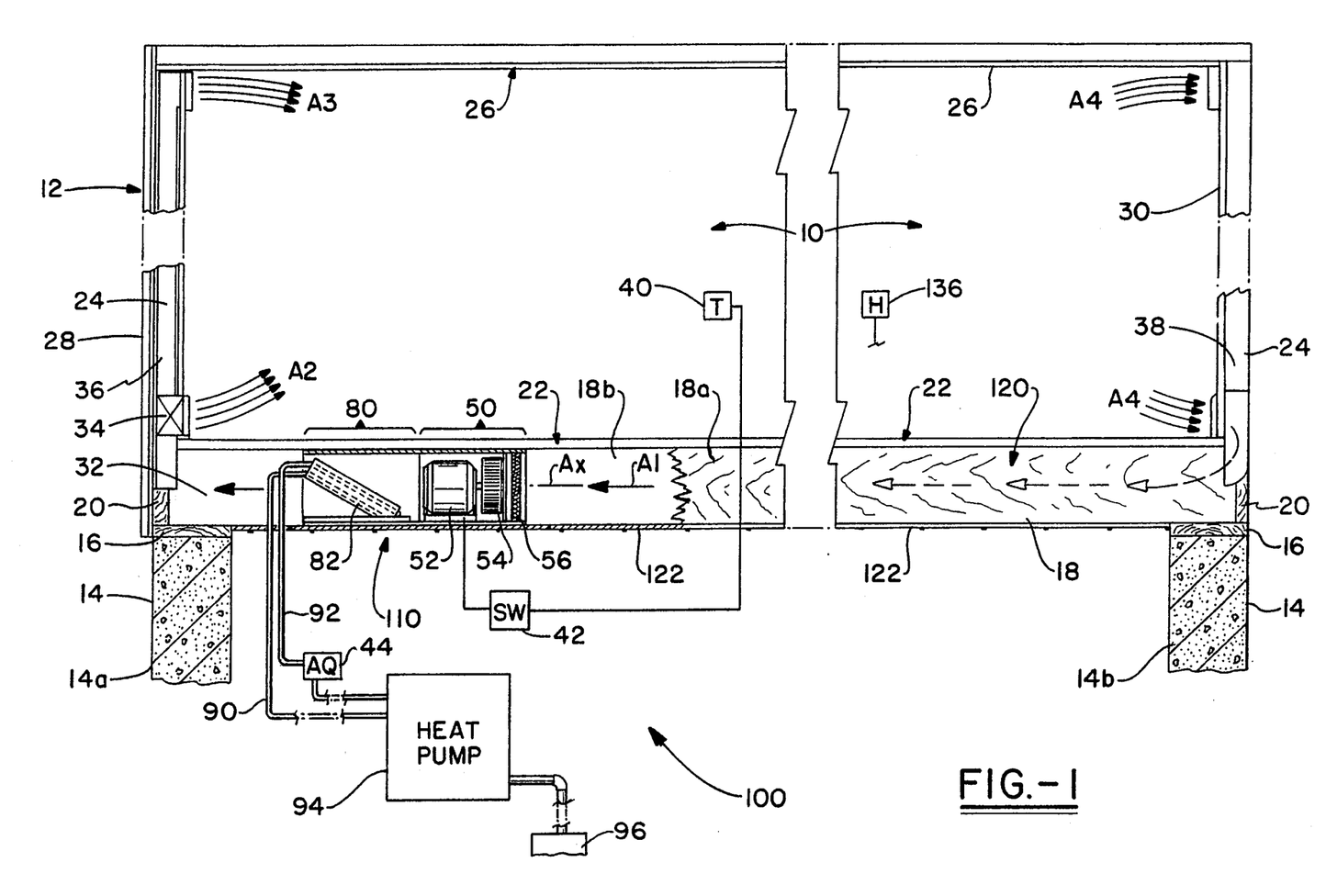
FIG. 1 is an elevational view, partially broken away and in cross-section, of a typical building construction illustrating the present invention as it comprises a system for heating and cooling building spaces.

Referring to FIG. 1 of the drawings, a heating/cooling system according to the present invention is illustrated and generally indicated by reference numeral 100 as such system may be applied to providing heated or cooled forced air to a building space which is generally indicated at reference numeral 10. The building space 10 may be defined in a conventional manner by way of the floor, ceiling, and walls of a building 12. For example, the building 12 may be supported on a foundation 14 of a known construction and it will carry sill planks 16 which may be bolted, or otherwise fastened, to the foundation 14. A plurality of floor joists 18 are carried on the sill planks 16 and these are maintained in spaced and parallel orientation by header planks 20. In the drawing, a pair of floor joists is shown and these are indicated at reference numerals 18a and 18b, the joist nearest the viewer being 18a which is broken away for the purposes of this description.

A sub-floor 22 is fastened to the top surface of the floor joists 18 in a conventional manner and a plurality of vertical wall studs 24 define the perimeter extent while a ceiling structure 26 defines the vertical extent of the building space 10. The wall studs 24 carry various types of materials which are specified according to whether the wall is an exterior wall 28 or an interior wall 30. In this respect, the specific description of the materials is not shown and will not be described inasmuch as they are not an important consideration in the context of the present invention. In this respect also, the particular building design and/or construction is not an important consideration and the building may be any type of single family, multiple family, or commercial multi-story construction known in the building arts. Therefore, this invention is not considered limited in any way to a particular building configuration and/or construction type.

Figure 2:
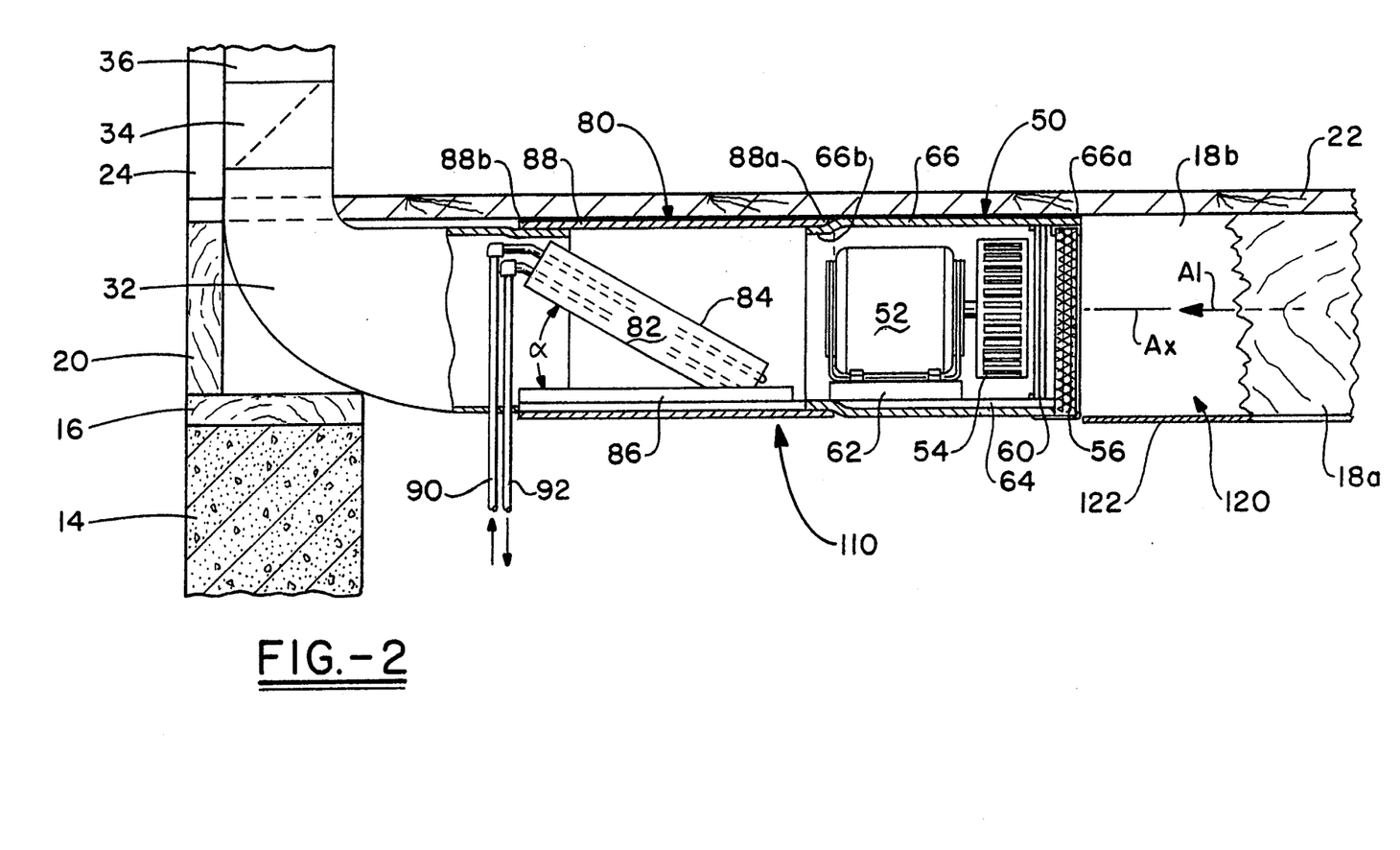
FIG. 2 is an elevational view, partially broken away and in cross-section, illustrating a mounting arrangement for the beating and cooling apparatus as such may be installed within the volume space provided between adjacent floor joists of a building construction.

Continuing with reference to FIG. 1 and now also to FIG. 2 of the drawings, a primary element of the invention and of the system 100 is a heating/cooling apparatus which is generally indicated by reference numeral 110. The apparatus 110 comprises a blower unit 50 and a heat exchanger unit 80 and these are coupled together in an upstream-downstream and in-line orientation as illustrated.

The upstream positioned blower unit 50 comprises an electric motor 52 direct-coupled to an impeller 54 which functions to draw air into the unit in the direction of reference arrow A1. The flow of air is drawn through an upstream positioned and mounted filter 56 and then through a baffle plate assembly 60. The baffle plate assembly 60 has an adjustable bore opening such that it may be centered with respect to a central longitudinal Ax axis of the impeller 54. This adjustment functions to direct air for optimum airflow through the impeller 54. The baffle plate assembly 60 will be described in more detail as the description proceeds. The motor 52 is mounted on a base member 62 and it and the baffle plate assembly 60 are carried on a movable tray member 64. A duct 66 surrounds the motor-impeller 52, 54, the baffle plate assembly 60, and the filter 56 such as to define an input end 66a and an output end 66b of the blower unit 50.

The heat exchanger unit 80 is positioned downstream from the blower unit 50 and it comprises a heat transfer assembly 82 which is mounted at an angle α such as to expose the largest surface area 84 to inflowing air generated in the blower unit. The heat transfer assembly 82 may be in any of numerous configurations known in the heat exchanger art and this invention is not limited to a particular configuration or design. The heat transfer assembly 82, however, must be configured to fit the confines of the heating/cooling apparatus 110 as defined by this specification.

The heat transfer assembly 82 is carried within a condensate collecting pan 86 which may include a drain means (not shown) and the assembly 82 and pan 86 are carried within and surrounded by a duct structure 88. The duct 88 defines an upstream input end 88a and a downstream output end 88b and the ducts 66 and 88 are matched configurations such that the downstream output end 66b of duct 66 may be connected to the upstream input end 88a of duct 88. The ducts 66 and 88, therefore, define a single continuous duct from an upstream input end 66a to a downstream output end 88b and these also define the height, width, and length extents of the heating/cooling apparatus 110. In accordance with this invention, the enclosure as defined by the ducts 66 and 88 exhibits height, width, and length dimensions such that the heating/cooling apparatus 110 may be installed within the volume confines as defined by a pair of parallel and spaced-apart floor joists of a building indicated at 18a and 18b.

The heating/cooling apparatus 110 is mounted and carried between two floor joists using various techniques and/or fastening means or devices and a particular one will be described in more detail hereinafter. In any event, the apparatus 110 is positioned between two floor joists 18a and 18b at an end position which places it in closest proximity to a building space 10 which is to receive heated or cooled conditioned air.

Airflow into the heating/cooling apparatus 110 is via a duct indicated generally at reference numeral 120, the duct being defined by the two spaced parallel floor joists 18a, 18b and the sub-floor 22. A metallic pan 122 is fastened to the joists to span the distance between the joists and to complete the enclosed duct 120. The pan 122 may be of various lengths and configuration to form the enclosed duct and this invention is not limited to a particular configuration suffice to say that such pan encloses the space between adjacent floor joists of a construction. A particular pan configuration, however, will be described hereinafter.

At the output end of the heating/cooling apparatus 110 as defined by the output 88b of duct 88, a metallic duct boot 32 is affixed in a manner so as to direct air into an airflow register 34 and duct 36 for distribution to the building space 10. The airflow register 34 and duct 36 are a metallic assembly and the register 34 is configured to be switchable such that heated air from the apparatus 110 is directed through the duct 36 and into the building space 10 at the arrows identified by reference A2 while cooled air from the apparatus 110 is directed through the duct 36 and into the building space 10 at the location indicated by the arrows referenced A3. Of course, the return air is moved out of the space 10 at the locations of arrows indicated by references A4 and a duct 38 in the wall 30.

The heat transfer assembly 82 has an input 90 and an output 92 and these carry a working fluid to and from the heat exchanger 80. The working fluid may comprise any of the heat transfer fluids which are known and used in the heat exchanger art, but preferably, the fluid will comprise heated or chilled water as this may be received from a source 94. The source 94 may be a boiler, a chiller, an ice bath, or any other source suitable for this application, but preferably, it will comprise a heat pump receiving water from a ground water source 96. In this particular configuration, the heat pump converts 52° F. ground water to 150° F. water which is suitable for use in the heat transfer assembly 82 to provide heated air to the building space 10 as such may be generated in the heating/cooling apparatus 110. Alternatively, the 52° F. ground water is converted in the heat pump to 40° F. water which is suitable for use in the heat transfer assembly 82 to provide cooled air to the building space 10.

The blower motor 52 may be controlled in any conventional manner using a thermostat 40 located within the building space 10 and it controls a switch 42 for the on/off functions of the motor 52. In a similar manner, the temperature of the water in the heat transfer assembly 82 may be controlled by an aquastat or similar device 44 mounted in the return line 94 such that the heat pump maintains water temperature in line 90.

Figure 3:
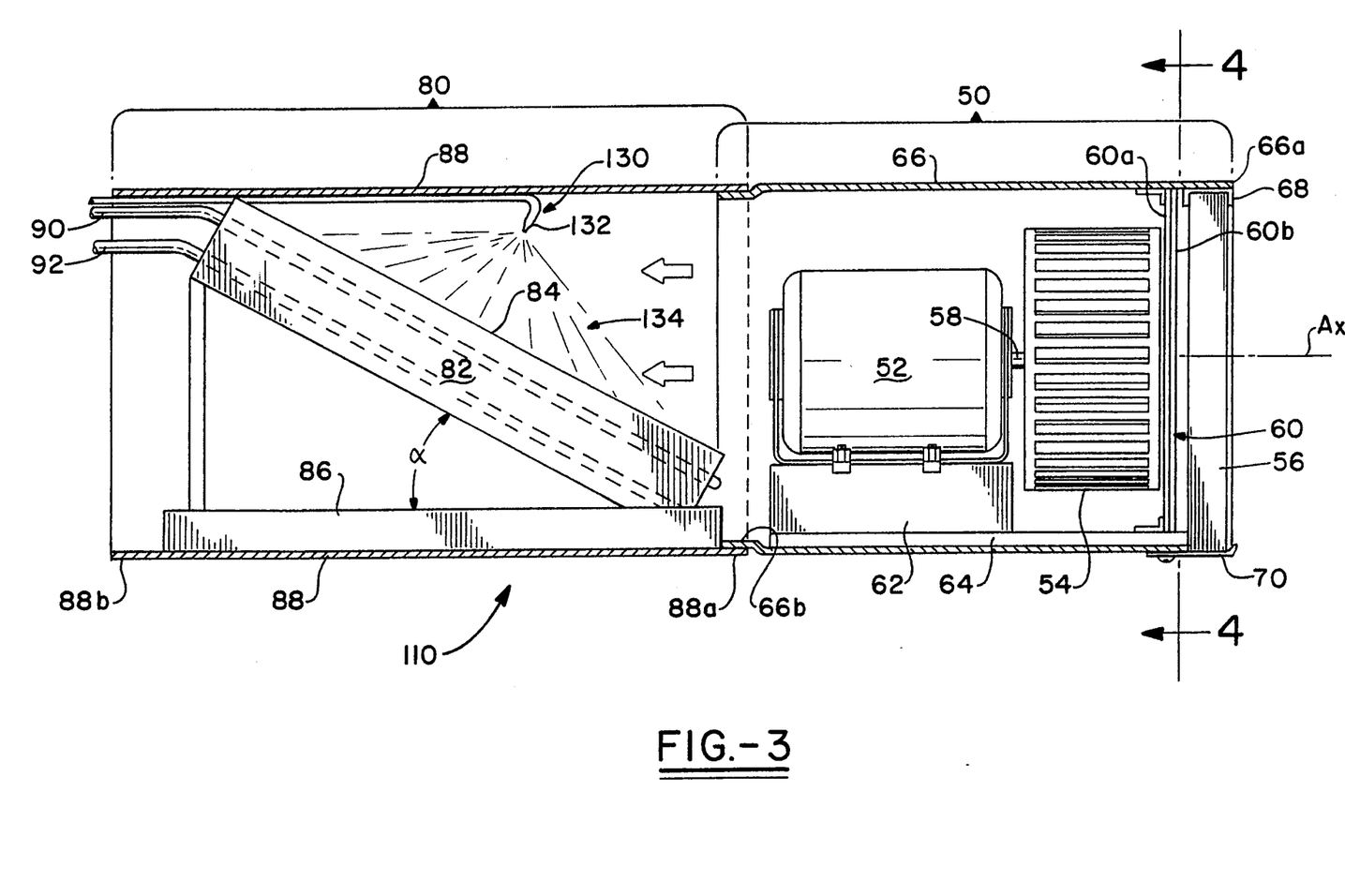
FIG. 3 is an enlarged elevational view, partially broken away and in cross-section, of the two units which comprise the heating and cooling apparatus of the invention.
Figure 4:
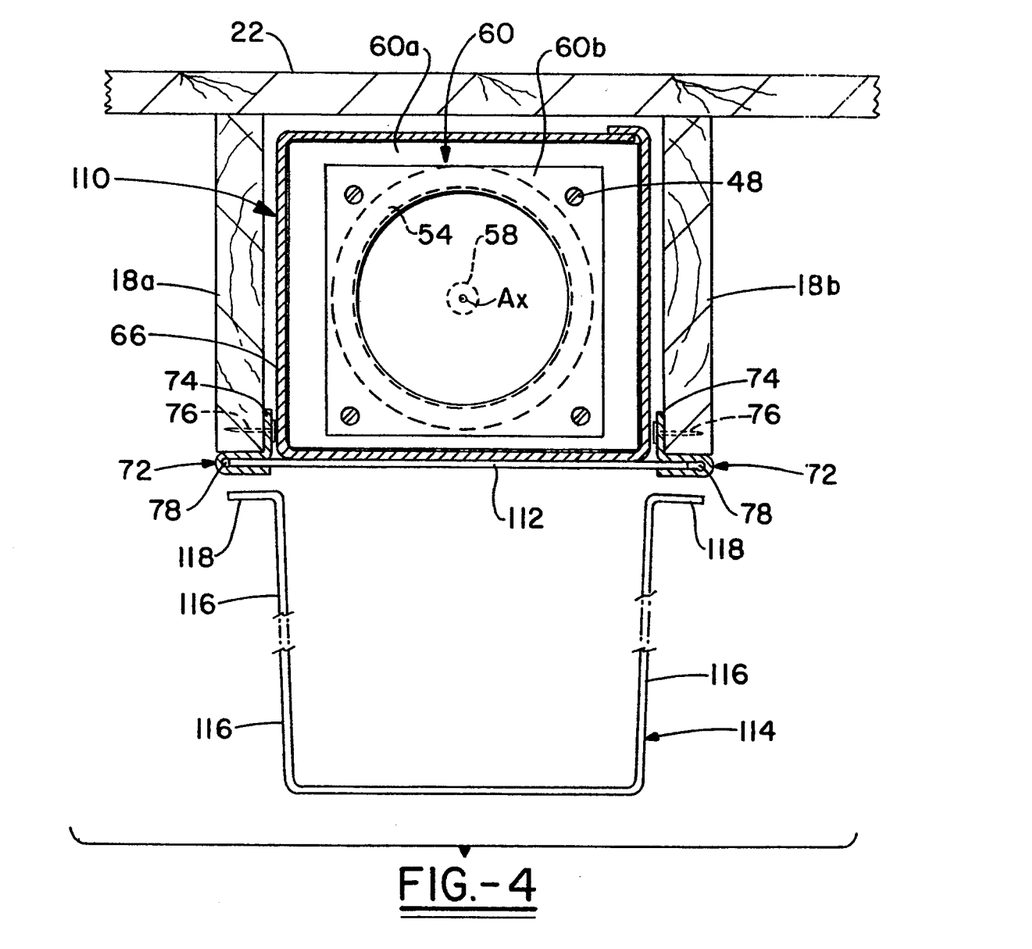
FIG. 4 is an end elevational view, partially broken away and in cross-section, of the heating and cooling apparatus as may be taken on line 4—4 of FIG. 3.

Referring to FIGS. 3 and 4 of the drawings, the heating and cooling apparatus of the invention as this is indicated at reference numeral 110 in FIGS. 1 and 2 will be described in greater detail. The blower motor 52 is a fractional horsepower motor which is direct-coupled to a steel impeller 54 via its output shaft 58. The motor 52 is resiliantly mounted in a conventional manner to minimize vibration and noise and the impeller exhibits about an eight inch diameter and about a five inch depth as measured along its longitudinal Ax axis. In this configuration, the motor-impeller combination is capable of delivering in excess of 800 CFM (cubic feet per minute) of airflow through the unit 50. In this respect, it is generally known and recognized that about 400 CFM is needed to develop one ton of heating or cooling capacity through a heat exchanger.

It will, of course, be recognized by those skilled in the art that motor and impeller specifications may be changed to accomplish varying output capacities. For example, the impeller output is a function of (a) the areas of its multiple blades, (b) the volume of air being moved by the blades, and (c) the speed of rotation as established by the motor. Thus, these may be changed to optimize operation for a specific building space to be heated or cooled. Such changes and/or variation, however, will be limited as these may affect unit size by the volume space of the duct enclosure as defined by ducts 66 and 88 of the heating/cooling apparatus 110.

The baffle plate assembly 60 is mounted in close proximity to the upstream input end of the impeller 54. The assembly 60 is comprised of a first plate member 60a that is mounted in a permanent manner adjacent the impeller 54. The plate member 60a has a bore through it which is slightly larger than the diameter of the largest impeller which may be used in the unit 50. The baffle plate assembly 60 also comprises a second plate member 60b which is movable about the impeller Ax axis and it has a bore through it that is slightly smaller than the inside diameter of an impeller to be used in the unit 50. Once an impeller 54 is selected for the blower unit 50, a plate member 60b of suitable bore diameter is affixed to the stationary plate 60a such that its bore center is aligned with the impeller axis. In this manner, an optimum airflow may be realized through the impeller for each sized one which may be applied to the blower unit 50. The movable plate member 60b may be fastened in place to the stationary plate member 60a via self-tapping screws 48 or by any other suitable type fastener.

The filter 56 is of a standard and well-known construction and it is sized to fit the bore area opening of the downstream input end 66a of duct 66. Preferably and as illustrated in FIG. 3, the filter is slightly longer than the vertical dimension of the duct 66 such as to extend at least to the bottom edge of the duct. The bottom of the duct 66 may be recessed by the thickness dimension of the filter 56 so that it may be oriented vertically within the duct opening. The filter is maintained within the duct opening by way of a U-shaped clip 68 fastened into the top of the duct, which clip defines a transverse channel into which the filter 56 may be carried at its top end. At its bottom end, the filter is maintained in position by at least one spring clip 70 fastened to the outside bottom surface of the duct. The clips 68 and 70 allow one to slide a filter 56 upwardly into the duct 66 until it is engaged by the clip 68 whereupon it is rotated into the duct opening so as to engage the lower clip 70. In this arrangement, a filter 56 may be removed from or inserted into the heating/cooling apparatus 110 without disturbing any other of the elements comprising the apparatus 110.

Referring to FIG. 4 of the drawings, a particular mounting arrangement of the healting/cooling apparatus 110 is shown in an end elevational view as may be taken through the duct 66 at the location of line 4—4 of FIG. 3. A pair of channel brackets 72 of a well-known configuration are mounted along the bottom edges of the floor joists 18a and 18b by way of a plurality of fasteners 76. The fasteners 76 may comprise nails and the like and these are passed through a vertical extension 74 of each bracket and into the inside surface of the joists 18 as illustrated. The brackets 72 define horizontally oriented channels 78 which have a spaced dimension suitable for carrying the thickness dimension of a support shelf 112. The shelf 112 is of such guage and stiffness as to provide a rigid support for holding the heating/cooling apparatus 110 in position in the space between the floor joists 18a and 18b. Preferably, the channel brackets 72 will exhibit a longitudinal length at least as long as the apparatus 110 but, of course, this may vary according to a particular installation. For example, a pair of channel brackets 72 may extend for the approximate length of the blower unit 50 while a second pair may extend for the approximate length of the heat exchanger unit 80. A space equal to the width dimension of a support shelf 112 may be left between the units 50, 80 for the insertion of such shelves and one such shelf 112 may be positioned to support the blower unit 50 while another shelf 112 may be positioned to support the heat exchanger unit 80. In this arrangement, either one or the other of the units 50, 80 may be disconnected from its respective supply sources and lowered from the space between the floor joists 18 for servicing and/or replacement.

To facilitate servicing of the heating/cooling apparatus 110 as described above, a servicing saddle member 114 may be fashioned so as to take advantage of the channel brackets 72. For example, a servicing saddle 114 may have side walls 116 which terminate at the top end in horizontal flanges 118. The flanges 118 may have a thickness dimenison as to engage the channels 78 in a friction-fit manner and the side walls 116 may be spring-loaded outwardly such that they must be moved inwardly to engage the channels 78. Once engaged within the channels 78, the servicing saddle 114 will function to carry the heating/cooling apparatus 110 or either one of its respective blower or exchanger units 50 and 80 for servicing in a safe manner. In this respect also, the servicing saddle 114 will have open ends such that the trays 64 of the blower unit 50 and 86 of the exchanger unit 80 may be slid out of their respective ducts 66 and 88 to expose the elements contained therein.

It will recognized that the channel brackets 72 may function in another way to accomplish the various objects of of the present invention. For example, the channel brackets 72 may extend the total length of the floor joists 18a and 18b as these are carried between opposite foundations 14a and 14b. The channel brackets 72 may function to carry sectional lengths of metallic panning 122 which completes the duct enclosure 120 shown in FIG. 1. The panning 122 will comprise flat sheets of a suitable width which may be cut to length to meet the particular installation and these may be either slid into the channels 78 in lengthwise manner and an end-to-end orientation or, bent slightly such that they may be inserted edgewise into respective channel brackets 72 of the floor joists 18.

The heating/cooling apparatus 110 may be adapted to function in various ways and for various applications. For example and referring to FIG. 3, the apparatus 110 may be adapted to include a means 130 for adding make-up air and moisture to the output air from the apparatus to humidify the building space 10. Accordingly, make-up air and water vapor may be pumped to a nozzle outlet 132 which functions to spray a mist 134 over the heat transfer assembly surface 84. Airflow through the assembly 82 will pick up moisture and any excess may be collected in the condensate collecting pan 86. A humistat or like humidity controller 136 may be located in the building space 10 to turn on and turn off the supply of air and water vapor being pumped to the nozzle 132. The source of such make up air and water vapor may be any suitable means available. This is, of course, a humidifying technique that is well-known, understood, and practiced in the industry.

Figure 5:
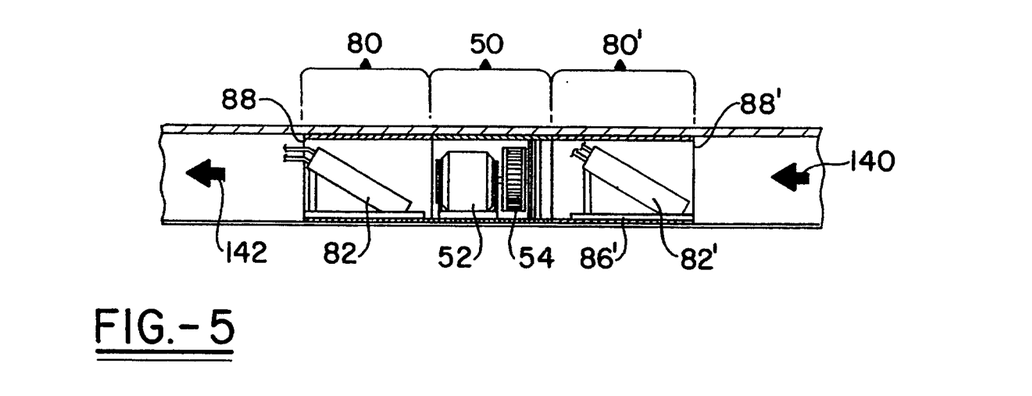
FIG. 5 is a side elevational view illustrating an embodiment of the invention adapted for dehumidifying warm moisture-laden air and to provide warmer and drier air to a building space.

The heating/cooling apparatus 110 may also be adapted to function as a dehumidifier and this may accomplished as illustrated in FIG. 5 of the drawings. The application may be, for example, to dehumidify a swimming pool enclosure (not shown in the drawing) while maintaining an adaquate warm air temperature in the enclosure. For this type of application a second heat exchanger unit indicated at 80' may be positioned at an upstream location with respect to the blower unit 50 such that the blower unit is positioned between the first heat exchanger unit 80 and the second heat exchanger unit 80'. The second heat exchanger unit 80' has a duct structure 88' which may be connected to the upstream input end 66a of the blower unit 50 and it has a heat transfer assembly 82' which conducts a heat transfer fluid through it which effectively condenses moisture contained in a warm moisture-laden airflow 140 being drawn from the pool enclosure. Of course, removing moisture from warm air tends to cool the air and this cooler air is then passed through the first heat exchanger unit 80 which has a heat transfer assembly 82 which conducts a heat transfer fluid through it for warming the air. Thus, a warm and drier airflow 142 is pumped back to the pool enclosure. The above-described dehumidifying system may, of course, include various type controllers which are well-known in the industry.

It should be pointed out and it will be recognized that the heating/cooling apparatus 110 is not limited to a mounting arrangement between floor joists 18 of a building structure 12. Many building constructions are made directly onto concrete pads, i.e., no foundation structures supporting floor joists as illustrated in FIG. 1 may be present. In this type of arrangement, the heating/cooling apparatus 110 may be mounted and/or positioned between a pair of spaced-apart and parallel ceiling joists which will be available or, at any other convenient and/or suitable location within the building construction. This is possible because of the heating-/cooling apparatus 110 compact size and unique configuration.

While certain representative embodiments and details of the inventive concept have been shown and described for the purpose of illustrating the invention, it will be apparent to those skilled in this art that various changes and/or modifications may be made thereto without departing from the spirit or scope of the invention. The invention, therefore, is only limited by the scope of the following claims.

I claim:

1. A heating/cooling system to supply heated and cooled forced air to a building space having a duct which directs forced air into the space, the system comprising in combination:

a blower unit comprised of an electric motor having an output shaft coupled to an impeller, said shaft and impeller being rotatable about a common axis to generate forced airflow through the unit, said impeller having an axial air intake bore therein and a first duct structure surrounding the unit which defines an upstream input end and a downstream output end of the unit, the axis of the shaft and impeller being aligned longitudinally of the first duct structure and the relative size of the impeller and the first duct structure being such as to define a clearance space between the periphery of the impeller and wall portions of the duct structure surrounding the impeller;

baffle means within the first duct structure in close proximity to the upstream end of the impeller extending transversely of the duct and closing off the clearance space around the periphery of the impeller from the portion of the first duct means which lies upstream from the impeller, said baffle means having a bore therethrough and adjustment means for shifting the bore of the baffle means to a position in substantially axial alignment with the air intake bore of the impeller means;

said impeller being adapted to receive air axially through its intake bore and expel the air radially outwardly around the entire periphery thereof into the clearance space surrounding the impeller where it is forced by the baffle means to flow in a longitudinal direction in the duct away from the baffle means;

a heat exchanger unit comprised of a heat transfer assembly adapted to carry a heat transfer fluid through it, and a second duct structure surrounding the unit which defines an upstream input end and a downstream output end of the unit, the upstream input end of the second duct structure connected to the downstream output end of the first duct structure of the blower unit to define a single continuous duct from the upstream input end of the blower unit to the downstream output end of the heat exchanger unit;

means to provide power to the motor and to control the on/off function of the motor according to the heating and cooling requirements of the building space; and means to provide a heat transfer fluid to the heat transfer assembly such that forced airflow generated in the blower unit is heated and cooled;

said blower and heat exchanger units having a size and configuration such that they may be positioned and mounted in close proximity to the building space and the downstream output end of the heat exchanger duct may be coupled to the duct which directs forced airflow into the building space.

2. The heating/cooling system as claimed in claim 1 wherein the blower unit further comprises a filter mounted within the upstream input end of the duct, said filter mounted in a manner to be accessed for removal without affecting any other elements of the blower and heat exchanger units.

3. The heating/cooling system as claimed in claim 1 wherein the adjustment means of the baffle means comprises a baffle plate assembly having a first and second baffle plate, the first baffle plate mounted in a stationary manner in the upstream input end of the first duct and adjacent to the impeller and having a central bore of a diameter which is substantially the diameter of the largest impeller which may be coupled to the motor and the second baffle plate being adjustably attached to the first plate said second baffle plate having a central bore which is substantially the bore diameter of the selected impeller coupled to the motor and which is axially aligned with the impeller bore axis to provide an optimum airflow through the impeller.

4. The heating/cooling system as claimed in claim 1 wherein the heat transfer fluid comprises water and a heat pump is adapted to provide heated or chilled water to the heat exchanger unit such that warmed or cooled forced airflow may be provided to the building space.

5. The heating/cooling system as claimed in claim 4 wherein the heat pump is connected to a source of commonly occurring ground water at some existing temperature and is adapted to convert the ground water to a higher temperature for use in the heat exchanger to supply heated forced air to the building space and to convert the ground water to a lower temperature for use in the heat exchanger to supply cooled forced air to the building space.

6. The heating/cooling system as claimed in claim 1 wherein the building space is defined by a sub-floor carried by a plurality of spaced-apart parallel floor joists and the blower and heat exchanger units are positioned and mounted between adjacent floor joists which are enclosed to form a return air duct to the upstream input end of the blower unit.

7. The heating/cooling system as claimed in claim 1 wherein the building space is defined by a ceiling structure comprised of a plurality of spaced-apart parallel ceiling joists and the blower and heat exchanger units are positioned and mounted between adjaacent ceiling joists which are enclosed to form a return air duct to the upstream input end of the blower unit.

8. The heating/cooling system as claimed in claim 1 wherein the motor is a fractional horsepower motor and the impeller has a diameter of up to 10 inches and an axial dimension such that the motor impeller combination can produce at least 800 CFM (cubic feet per minute) of airflow through the blower unit duct.

9. The heating/cooling system as claimed in claim 1 wherein the heat transfer assembly of the heat exchanger unit comprises copper heat transfer tubes in a aluminum fin matrix to produce at least 12,000 BTUs of heating and 10,000 BTUs of cooling capacity at its downstream output end.

10. The heating/cooling system as claimed in claim 1 wherein the heat exchanger unit further comprises a means to add moisture and make-up air to air flowing through the heat transfer assembly, said means including a means to spray a mist over the assembly and said heat exchanger unit also having a condensate pan which carries the heat transfer assembly such that excess moisture not absorbed into the airflow is collected in the pan.

11. The heating/cooling system as claimed in claim 1 wherein the heat exchanger unit connected to the downstream output end of the blower unit comprises a first heat exchanger unit which is adapted for warming air flowing through it and a second heat exchanger unit is connected to the upstream input end of the blower unit which is adapted to cool moisture-laden air flowing through it such that warmed dehumidified forced air is supplied by the blower and heat exchanger units to the building space.

12. A heating/cooling apparatus to supply heated and cooled forced air to a building space having a duct to direct forced air into the space, the apparatus comprising in combination:

a blower unit comprised of an electric motor having an output shaft coupled to an impeller, said shaft and impeller being rotatable about a common axis to generate forced airflow, said impeller having an axial air intake bore therein and a first duct structure which surrounds the unit to define an upstream input end at the impeller and a downstream output end at the motor, the axis of the shaft and impeller being aligned longitudinally of the first duct structure and the relative size of the impeller and the first duct structure being such as to define a clearance space between the periphery of the impeller and wall portions of the duct structure surrounding the impeller;

baffle means within the first duct structure in close proximity to the upstream end of the impeller extending transversely of the duct and closing off the clearance space around the periphery of the impeller from the portion of the first duct means which lies upstream from the impeller, said baffle means having a bore therethrough and adjustment means for shifting the bore of the baffle means to a position in substantially axial alignment with the air intake bore of the impeller means;

said impeller being adapted to receive air axially through its intake bore and expel the air radially outwardly around the entire periphery thereof into the clearance space surrounding the impeller where it is forced by the baffle means to flow in a longitudinal direction in the duct away from the baffle means;

a heat exchanger unit comprised of a heat transfer assembly adapted to pass a heat transfer fluid through it, and a second duct structure which surrounds the unit to define an upstream input end and a downstream output end, the upstream input end of the second duct structure connected to the downstream output end of the first duct structure of the blower unit such as to define a single continuous duct from the upstream input end of the blower unit to the downstream output end of the heat exchanger unit;

said apparatus being of such size and configuration as to facilitate positioning and mounting it in close proximity to the building space and connectable to the building duct which directs forced airflow into the building space.

13. The heating cooling apparatus as claimed in claim 12 wherein the blower unit also comprises a filter mounted within the duct structure at an upstream position with respect to the impeller.

14. The heating/cooling apparatus as claimed in claim 12 wherein the adjustment means of the baffle means is a baffle plate assembly having first and second plates, the first plate being mounted in a stationary position adjacent the impeller and having a bore diameter that is substantially the diameter of the bore of the largest impeller which may be coupled to the motor and the second plate being adjustably attached to the first plate in such manner that its bore which has a diameter substantially equal to the bore diameter of the selected impeller coupled to the motor may be axially aligned with the impeller bore.

15. The heating/cooling apparatus as claimed in claim 12 wherein the heat exchanger unit also comprises a collecting pan in which the heat transfer assembly is carried to collect condensate moisture from the assembly.

16. The heating/cooling apparatus as claimed in claim 15 wherein the heat exchanger unit further comprises a means to supply make-up air and moisture to the air flowing through the heat transfer assembly.

17. The heating/cooling apparatus as claimed in claim 12 further comprising a second heat exchanger unit having a heat transfer assembly and a duct structure that is connected to the upstream input end of the blower unit, said second heat exchanger unit adapted to dehumidify air passing through its heat transfer assembly while the heat exchanger unit connected to the downstream output end of the blower unit is adapted for warming air passing through its heat transfer assembly.

18. The heating/cooling apparatus as claimed in claim 13 wherein the filter is mounted within the duct structure by way of a channel clip secured at the bottom of the duct such that the filter may be accessed and removed from the duct without disturbing any other elements of the heating/cooling apparatus.

19. The heating/cooling apparatus as claimed in claim 12 wherein the blower and heat exchanger units are of such size and configuration as to facilitate positioning and mounting them between a pair of floor joists of a building construction such that the volume space as defined by the floor joists may be enclosed to function as an air return duct to the apparatus.

20. The heating/cooling apparatus as claimed in claim 12 wherein the blower and heat exchanger units are of such size and configuration as to facilitate positioning and mounting it between a pair a ceiling joists of a building construction such that the volume space as defined by the ceiling joists may be enclosed to function as an air return duct to the apparatus.

21. The heating/cooling apparatus as claimed in claim 12 wherein the motor comprises a fractional horsepower motor and the impeller has a diameter of up to 10 inches and an axial dimension such as to produce at least 800 CFM (cubic feet per minute) of airflow capacity through the blower unit duct structure.

22. The heating/cooling apparatus as claimed in claim 12 wherein the heat transfer assembly comprises copper heat transfer tubing in an aluminum fin matrix.

23. The heating/cooling apparatus as claimed in claim 20 wherein the apparatus is maintained between the joists by way of at least one support shelf mounted between channel brackets fastened to the bottom edges of the joists.

24. The heating/cooling apparatus as claimed in claim 19 wherein the heat transfer assembly is mounted at an angle alpha with reference to the blower unit output airflow to project the largest surface area for maximum heat transfer efficiency.

25. A heating/cooling system for a building to supply forced air to an interior space of the building having at least one air supply duct in communication with the building space, the system comprising:

an elongated air treatment duct located between parallel frame members of the building having a downstream output end in communication with the air supply duct;

a heat exchanger unit mounted within the air treatment duct;

liquid supply means providing a flow of liquid a controlled temperature through the heat exchanger unit;

impeller means rotatable about an axis in longitudinal alignment with the air treatment duct to cause air to flow through the air treatment duct past the heat exchanger unit and into the air supply duct, said impeller means having one end facing upstream in the air treatment duct and the other end facing downstream, and having an axial air intake bore at its upstream facing end, the entire periphery of the impeller means defining a clearance space between the impeller and adjacent wall surfaces of the air treatment duct surrounding the impeller;

drive means rotating the impeller means to cause air to be drawn into its air intake bore and expelled radially outwardly into the clearance space around the entire entire impeller means;

baffle means extending transversely across the interior of the air treatment duct in close proximity to the upstream end of the impeller means, said baffle means having a bore therethrough and adjustment means for shifting the bore of the baffle means to a position in substantially axial alignment with the air intake bore of the impeller means, said baffle means closing off the clearance space in the air treatment duct radially outwardly from the periphery of the impeller means to permit air flow from the impeller to travel only in a downstream direction in the air treatment duct; and access means in the air treatment duct for servicing the heat exchanger unit and the impeller means.

* * * * *